US012578589B2

(12) United States Patent
Niu et al.

(10) Patent No.: US 12,578,589 B2
(45) Date of Patent: Mar. 17, 2026

(54) CAMERA MODULE

(71) Applicant: VIVO MOBILE COMMUNICATION CO., LTD., Guangdong (CN)

(72) Inventors: Zhihao Niu, Guangdong (CN); Dongcun Cheng, Guangdong (CN); Wei Wang, Guangdong (CN); Dong Xie, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 386 days.

(21) Appl. No.: 18/329,695

(22) Filed: Jun. 6, 2023

(65) Prior Publication Data

US 2023/0314831 A1      Oct. 5, 2023

Related U.S. Application Data

(63) Continuation of application No. PCT/CN2021/135631, filed on Dec. 6, 2021.

(30) Foreign Application Priority Data

Dec. 8, 2020    (CN) .......................... 202011425602.3

(51) Int. Cl.
*G02B 27/64* (2006.01)
*G03B 5/00* (2021.01)
(Continued)

(52) U.S. Cl.
CPC ............. *G02B 27/646* (2013.01); *G03B 5/00* (2013.01); *H02N 2/108* (2013.01); *H02N 2/123* (2013.01);
(Continued)

(58) Field of Classification Search
CPC ........ H02N 2/108; H02N 2/123; H02N 2/163; G03B 2205/0007; G03B 2205/0023;
(Continued)

(56) References Cited

U.S. PATENT DOCUMENTS 5,798,598 A * 8/1998 Fujimoto ............... H02N 2/163
310/323.04
6,546,202 B1 4/2003 Onozuka et al.
(Continued)

FOREIGN PATENT DOCUMENTS

CN         101206297 A      6/2008
CN         103135317 A      6/2013
(Continued)

*Primary Examiner* — Bumsuk Won
*Assistant Examiner* — Alex Park Rickel
(74) *Attorney, Agent, or Firm* — Price Heneveld LLP

(57) ABSTRACT

This application discloses a camera module including a bracket, where the bracket is provided with a groove; a drive member, where the drive member is disposed on a first side of the bracket; a transmission member, where the transmission member is disposed on an inner wall of the groove, and the transmission member is electrically connected to the drive member; and a lens module, where at least part of the lens module is disposed in the groove, the lens module is movably connected to the transmission member, and the transmission member is configured to drive the lens module to move.

13 Claims, 7 Drawing Sheets

(51) Int. Cl.

| | | |
|---|---|---|
| *H02N 2/10* | (2006.01) |
| *H02N 2/12* | (2006.01) |
| *H04N 23/55* | (2023.01) |
| *H04N 23/68* | (2023.01) |

(52) U.S. Cl.
CPC ........... *H04N 23/55* (2023.01); *H04N 23/687* (2023.01); *G03B 2205/0007* (2013.01); *G03B 2205/0061* (2013.01)

(58) Field of Classification Search
CPC .. G03B 2205/0061; G03B 17/12; G03B 5/00; G03B 5/06; H04N 23/50; H04N 23/55; H04N 23/57; H04N 23/68; H04N 23/687; H04N 23/682; H04N 23/685; G02B 27/646
See application file for complete search history.

(56) References Cited

U.S. PATENT DOCUMENTS

| | | | |
|---|---|---|---|
| 2004/0190863 A1 | 9/2004 | Nishimura et al. |
| 2009/0109317 A1 | 4/2009 | Yuan |
| 2010/0127598 A1* | 5/2010 | Sun ........................ H02N 2/103 |
| | | | 310/323.02 |

| | | | |
|---|---|---|---|
| 2017/0150055 A1* | 5/2017 | Chung ................... H04N 23/60 |
| 2018/0093375 A1* | 4/2018 | Mori ................. G03G 15/1615 |
| 2019/0373143 A1 | 12/2019 | Overmann |
| 2020/0166726 A1 | 5/2020 | Wang |
| 2020/0213495 A1 | 7/2020 | Fujimoto et al. |

FOREIGN PATENT DOCUMENTS

| | | | |
|---|---|---|---|
| CN | 204129405 U | 1/2015 |
| CN | 109922238 A | 6/2019 |
| CN | 209167632 U | 7/2019 |
| CN | 111399163 A | 7/2020 |
| CN | 111580240 A | 8/2020 |
| CN | 111679395 A | 9/2020 |
| CN | 211791725 U | 10/2020 |
| CN | 112492175 A | 3/2021 |
| JP | H07234447 A | 9/1995 |
| JP | H096435 A | 1/1997 |
| JP | H1094275 A | 4/1998 |
| JP | 2005311758 A | * | 11/2005 |
| JP | 2011066595 A | 3/2011 |
| JP | 2012063423 A | 3/2012 |
| JP | 2013222187 A | 10/2013 |
| TW | 201321826 A | 6/2013 |

* cited by examiner

CAMERA MODULE

CROSS-REFERENCE TO RELATED APPLICATIONS

This application is a continuation application of PCT International Application No. PCT/CN2021/135631 filed on Dec. 6, 2021, which claims priority to Chinese Patent Application No. 202011425602.3 filed on Dec. 8, 2020, which are incorporated herein by reference in their entireties.

TECHNICAL FIELD

This application pertains to the field of electronic device technologies, and specifically, relates to a camera module.

BACKGROUND

With the continuous updating and iteration of electronics, the camera module plays an increasingly important role, and the shooting performance of the camera module has become a key factor affecting the overall performance of the electronics. During picture or video shooting, the camera module inevitably shakes. Thus, it is urgent to develop a camera module with an anti-shake effect.

SUMMARY

Embodiments of this application provide a camera module including a bracket, where the bracket is provided with a groove; a drive member, where the drive member is disposed on a first side of the bracket; a transmission member, where the transmission member is disposed on an inner wall of the groove, and the transmission member is electrically connected to the drive member; and a lens module, where at least part of the lens module is disposed in the groove, the lens module is movably connected to the transmission member, and the transmission member is configured to drive the lens module to move.

Additional aspects and advantages of this application will be given in part in the following description, part of which will become apparent from the following description or be learned from the practice of the embodiments of this application.

BRIEF DESCRIPTION OF DRAWINGS

The above and/or additional aspects and advantages of this application will become obvious and easy to understand from the description of the embodiments with reference to the following drawings.

Figure 1:
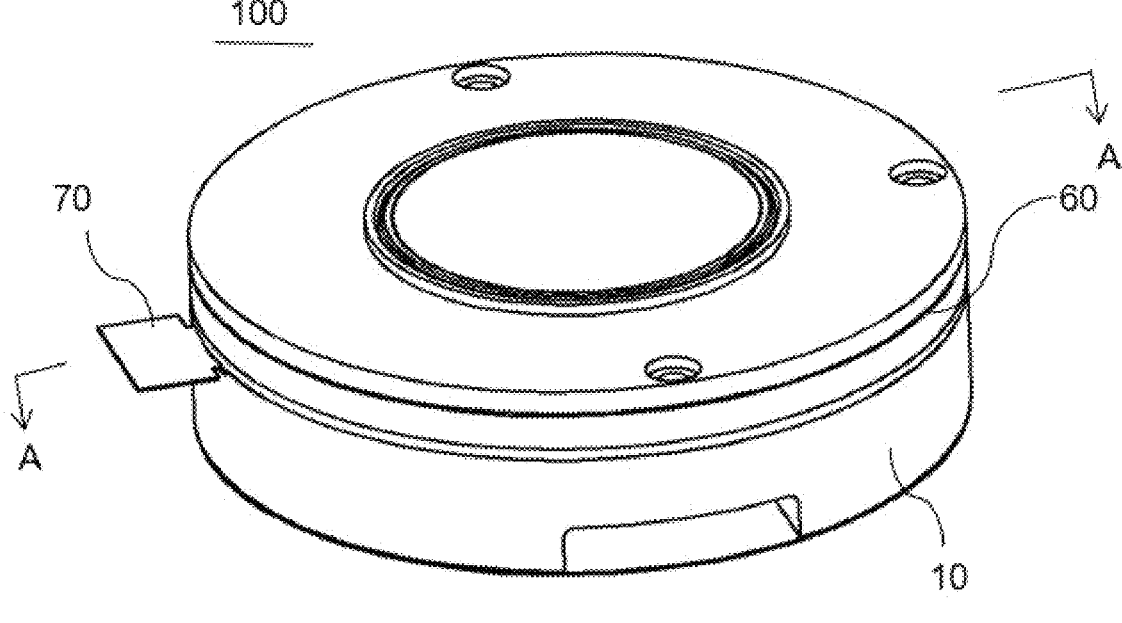
FIG. 1 is a schematic diagram of a camera module according to an embodiment of this application.

REFERENCE SIGNS ARE DESCRIBED AS FOLLOWS camera module 100;

bracket 10; groove 11;

drive member 20; first piezoelectric element 21; second piezoelectric element 22; third piezoelectric element 23; fourth piezoelectric element 24;

transmission member 30; mounting channel 31; first segment 32; second segment 33;

lens module 40;

lens bracket 41; lens bracket body 411; annular groove 412; friction piece 413;

lens 42;

protrusion assembly 50; protrusion part 51;

fixing bracket 60; and flexible circuit board 70.

DESCRIPTION OF EMBODIMENTS

The embodiments of this application are described in detail below. Examples of the embodiments are shown in the accompanying drawings, and reference signs that are the same or similar always indicate the same or similar components or components with the same or similar functions. The embodiments described below with reference to the drawings are illustrative and merely for explaining this application. They should not be construed as limitations on this application. Persons of ordinary skill in the art can still obtain other embodiments based on the embodiments of this application without creative efforts, and all these embodiments shall fall within the protection scope of this application.

A feature modified by the term "first", "second", or the like in the specification and claims of this application can explicitly or implicitly include one or more such features. In the descriptions of this application, "a plurality of" means at least two unless otherwise stated. In addition, "and/or" in the specification and claims represents at least one of connected objects, and the character "/" generally indicates that the associated objects have an "or" relationship.

In the descriptions of this application, it should be understood that the orientations or positional relationships indicated by the terms "center", "longitudinal", "transverse", "length", "width", "thickness", "upper", "lower", "front", "rear", "left", "right", "vertical", "horizontal", "top", "bottom", "inside", "outside", "clockwise", "counterclockwise", "axial", "radial", "circumferential", and the like are based on the orientations or positional relationships shown in the accompanying drawings. These terms are merely for the ease and brevity of description of the embodiments of this application rather than indicating or implying that the apparatuses or components mentioned in this application must have specific orientations or be constructed and manipulated according to specific orientations, and therefore shall not be construed as any limitations on this application.

In the description of this application, it should be noted that unless otherwise specified and defined explicitly, the terms "mount", "connect", and "join" should be understood in their general senses. For example, they may refer to a fixed connection, a detachable connection, or an integral connection; a mechanical connection or an electrical connection; and a direct connection, an indirect connection via an intermediate medium, or an internal communication between two elements. Persons of ordinary skill in the art can understand specific meanings of these terms in this application as appropriate to specific situations.

A camera module 100 according to embodiments of this application is described with reference to FIGS. 1 to 9.

As shown in FIGS. 1 to 4, the camera module 100 according to embodiments of this application includes a bracket 10, a drive member 20, a transmission member 30, and a lens module 40.

Specifically, the bracket 10 is provided with a groove 11, the drive member 20 is disposed on a first side of the bracket 10, the transmission member is disposed on an inner wall of the groove 11, and the transmission member 30 is electrically connected to the drive member 20. At least part of the lens module 40 is disposed in the groove 11, the lens module 40 is movably connected to the transmission member 30, and the transmission member 30 is configured to drive the lens module 40 to move.

In other words, the camera module 100 according to embodiments of the present invention mainly includes the bracket 10 with a support function, the drive member 20 capable of generating a drive force, the transmission member 30 connected to the drive member 20 and capable of transmitting the drive force, and the lens module 40 connected to the transmission member 30 and capable of moving under the action of the drive force.

Specifically, the bracket 10 is provided with a groove 11, and at least part of the lens module 40 is provided in the groove 11, and the lens module 40 can extend out of the groove 11 to shoot the surrounding environment. The drive member 20 is disposed on the first side of the bracket 10 and can transmit the drive force through the transmission member 30, thus driving the lens module 40 to move with respect to the bracket 10. The transmission member 30 is electrically connected to the drive member 20, and the transmission member 30 can drive the lens module 40 to move.

It should be noted that the transmission member 30 and the bracket 10 are mounted in manners including but not limited to the following:

In one embodiment, the transmission member 30 is arranged around an inner wall surface of the groove 11, and a contact region between the transmission member 30 and the lens module 40 can form an annular region to drive the outer side surface of the lens module 40.

In another embodiment, the transmission member 30 is provided in a plurality of mounting positions on the inner wall surface of the groove 11, where the plurality of mounting positions may be symmetrically or asymmetrically arranged with respect to the lens module 40. When the plurality of mounting positions are symmetrical with respect to the lens module 40, two or four mounting positions can be provided. For ease of description, it is defined that the bracket 10 extends along plane xy and the groove 11 extends along direction z.

When two mounting positions are provided, one of them may be located in axis x and the other may be located in axis y, allowing the lens module 40 to move around x and y.

When four mounting positions are provided, two of them may be located in axis x and the other two may be located in axis y. In addition, the four mounting positions may be arranged symmetrically with respect to the lens module 40.

It should be noted that symmetrically providing an even quantity of mounting positions helps to precisely control the swinging amplitude of the lens module 40 when the lens module 40 rotates around a specific direction.

Figure 2:
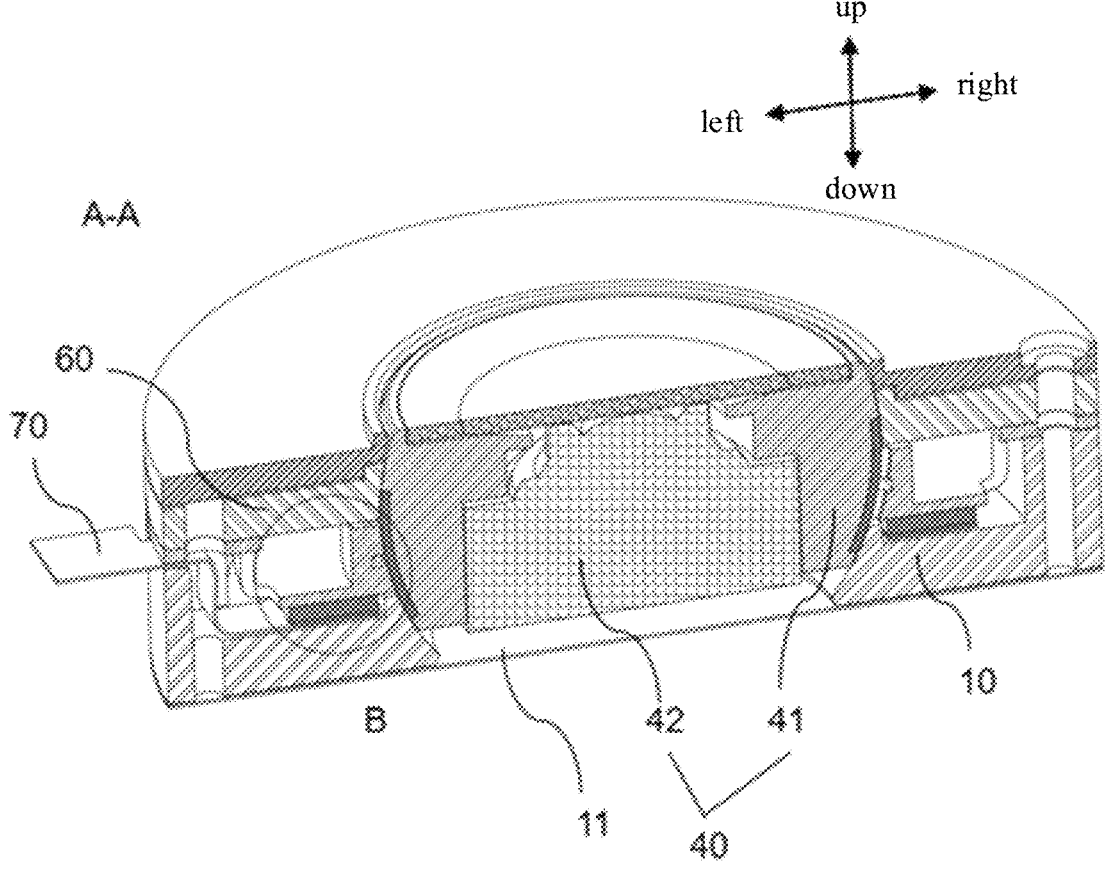
FIG. 2 is a cross-sectional view along line A-A in FIG. 1.

In addition, the transmission member 30 of the camera module 100 according to embodiments of the present invention is not limited to the arrangement on the inner wall of the groove 11 but may instead be arranged on the extension line of the inner wall surface of the groove 11. For example, as shown in FIG. 2, the lower part of the lens module 40 is located in the groove 11, and the transmission member 30 is disposed above the bracket 10 and on the extension line of the inner wall surface of the groove 11 and can be connected to the middle part of the lens module 40 to drive the lens module 40 to move.

As such, according to the camera module 100 of embodiments of this application, when the camera module 100 shakes, the drive member 20 can drive, through the cooperation with the transmission member 30, the lens module 40 to move in the direction opposite to the shaking of the camera module 100, thus counteracting the shaking caused by vibration, allowing the camera module 100 to have an anti-shake function.

According to an embodiment of this application, the transmission member 30 includes a first segment 32 and a second segment 33 that are connected sequentially, the first segment 32 being disposed on the first side of the bracket 10, and the drive member 20 being disposed between the bracket 10 and the first segment 32. The second segment 33 is disposed on the inner wall of the groove 11, and an end of the second segment 33 back away from the first segment is movably connected to the lens module 40. It should be noted that the second segment 33 may be disposed on an inner wall of the groove 11 or on the extension line of the inner wall of the groove 11, which is not limited herein.

In this embodiment, the transmission member 30 is designed as a structure where the first segment 32 and the second segment 33 fit with each other, which can not only ensure the contact area between the first segment 32 and the drive member 20, but also ensure the effective contact between the second segment 33 and the lens module 40, thus improving the stability and precision of anti-shaking of the lens module 40.

Further, the first segment 32 and the second segment 33 are integrally formed, which facilitates the processing and production. In addition, the second segment 33 is an annular structure. This can not only improve the balance of the support force for the lens module 40, but also expand the contact area between the transmission member 30 and the lens module 40, thus facilitating the movement of the lens module 40 at multiple freedom degrees and multiple angles.

Optionally, arranging the bracket 10 as an annular member co-axial with the transmission member 30 can not only support the transmission member 30, but also avoid the bracket 10 impeding the movement of the lens module 40.

For ease of description, it is defined below that the transmission member 30 and the bracket 10 extend along the horizontal direction.

The groove 11 and the drive member 20 are disposed above the bracket 10, the first segment 32 in contact with the drive member 20 is disposed above the drive member 20, and the drive member 20 can transmit the drive force to the lens module 40 through the first segment 32 and the second segment 33 and drive, through a friction force, the lens module 40 to move. It should be noted that the second segment 33 can also be in direct contact with the drive member 20, which is not limited herein.

Figure 4:
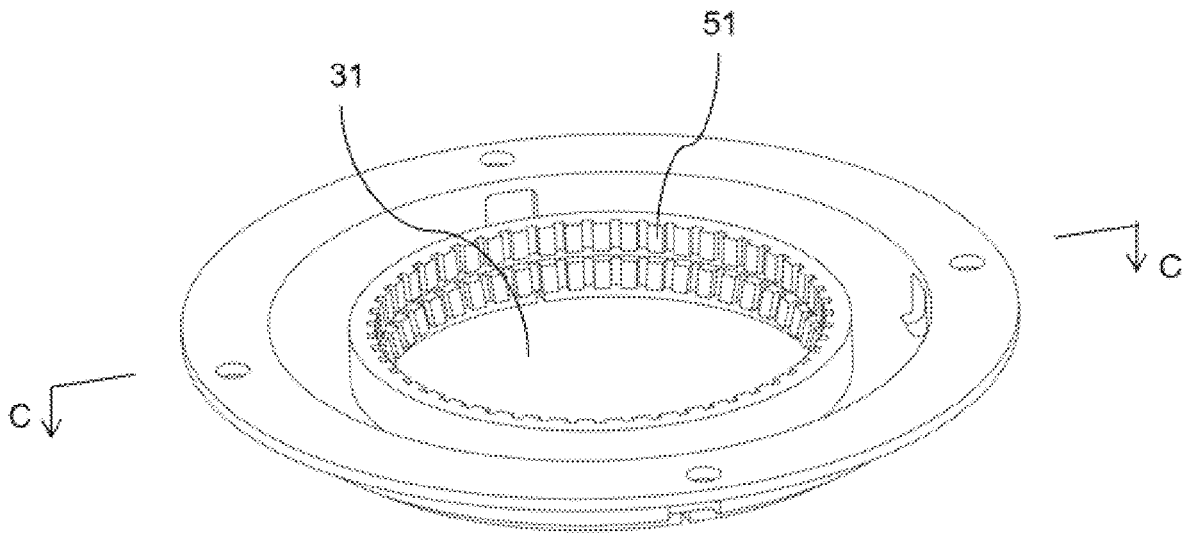
FIG. 4 is a schematic diagram of fitting of a transmission member and piezoelectric elements of a camera module according to an embodiment of this application, viewed from one perspective.
Figure 5:
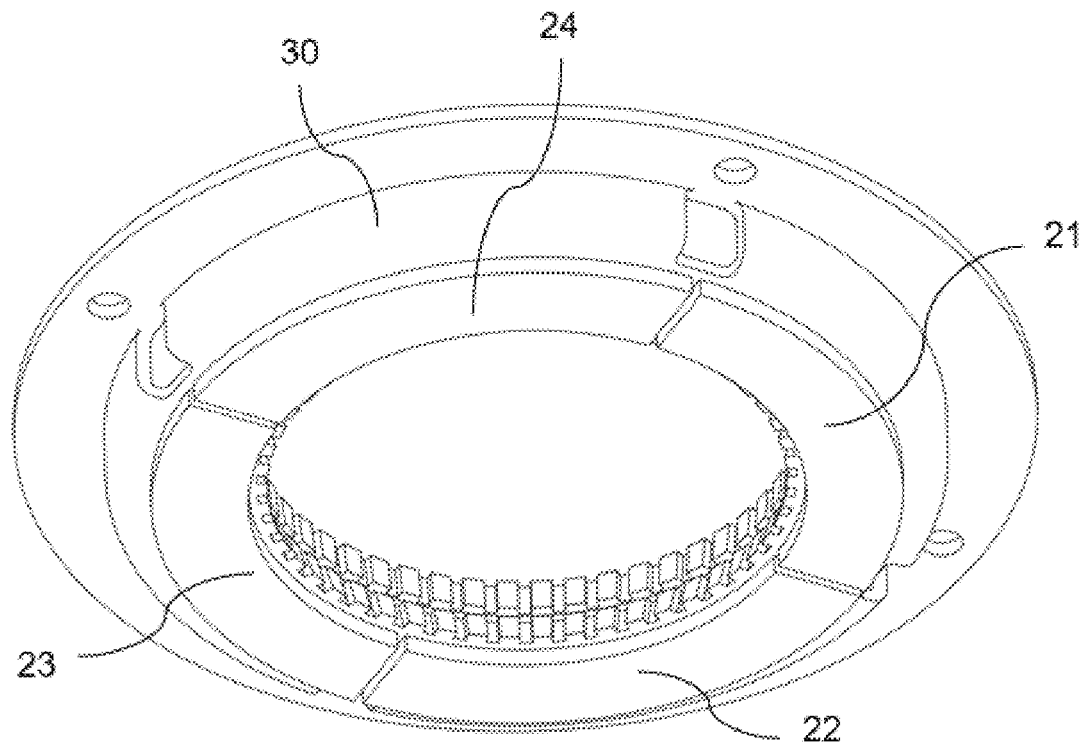
FIG. 5 is a schematic diagram of fitting of a transmission member and piezoelectric elements of a camera module according to an embodiment of this application, viewed from another perspective.
Figure 6:
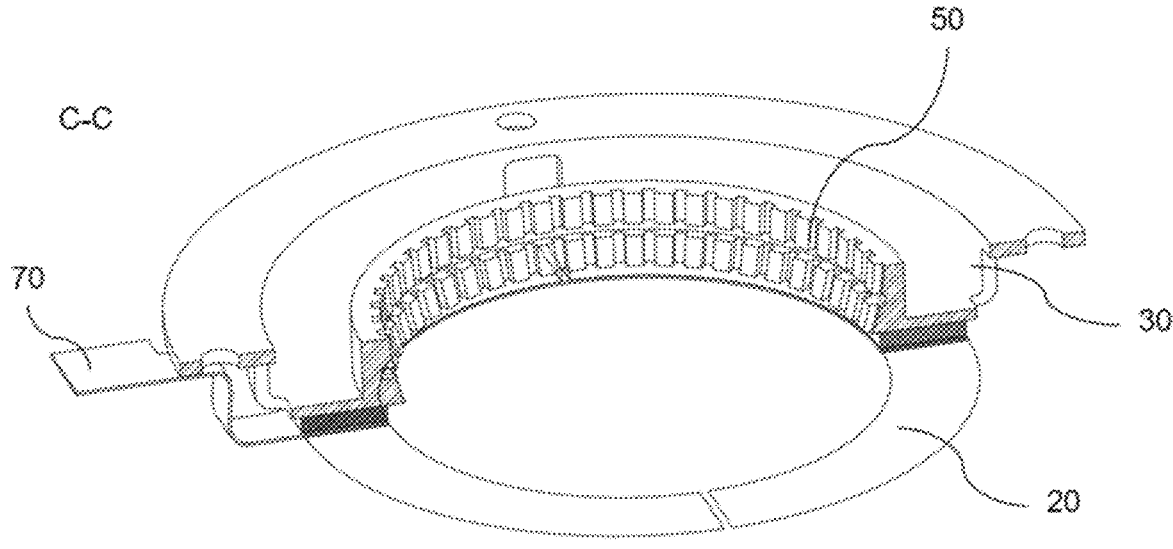
FIG. 6 is a local cross-sectional view along line C-C in FIG. 4.

In some specific implementations of this application, as shown in FIGS. 4 to 6, an inner peripheral surface of the transmission member 30 is provided with a protrusion assembly 50 along a peripheral direction of the transmission member, and the protrusion assembly 50 can improve the friction force between the transmission member 30 and the lens module 40. The protrusion assembly 50 includes a plurality of protrusion parts 51, the plurality of protrusion parts 51 being spaced apart along the peripheral direction of the transmission member 30. Each of the protrusion parts 51 protrudes inward with respect to an inner surface of the transmission member 30, and an inner surface of each of the protrusion parts 51 abuts against the lens module 40. The drive member can transmit the drive force to the protrusion parts 51. For example, when the drive force is a vibration force, the corresponding protrusion parts 51 can also vibrate. In other words, the protrusion parts 51 can not only expand the deformation degree of the transmission member 30, but also partition the friction force between the transmission member 30 and the lens module 40, thus improving the precision of controlling the movement angle and movement range of the lens module 40.

It should be noted that each of the protrusion parts 51 abutting against the lens module 40 can further improve the friction force between the transmission member 30 and the lens module 40, facilitating the movement of the lens module 40, and can also ensure the operation stability of the lens module 40 when the transmission member 30 transmits the drive force to the lens module 40.

In other words, as shown in FIG. 4, in a case that the transmission member 30 is an annular member, an annular hollow region of the annular member forms a mounting channel 31. The inner wall surface of the annular member is provided with the protrusion parts 51 that extend in the direction of the central axis of the mounting channel 31 and protrude from the inner wall surface of the annular member. The protrusion part 51 is provided in plurality. The plurality of protrusion parts 51 can be spaced apart along the inner wall surface of the annular member, and the plurality of protrusion parts 51 can enclose an annular shape. When the high side of the transmission member 30 extends in the up-and-down direction, the gap between two adjacent protrusion parts 51 may be designed to extend in the up-and-down direction. This helps the transmission member 30 to drive the lens module 40 to rotate about the Z-axis direction.

It should be noted that when the transmission member 30 is located above the drive member 20 and part of the drive member 20 vibrates, the protrusion part 51, corresponding to the vibrated part of the drive member, on the transmission member 30, moves synchronously.

Further, at least two protrusion assemblies 50 are provided, and the quantity of the protrusion assemblies 50 may be odd or even and is not limited. The at least two protrusion assemblies 50 are spaced apart along the axial direction of the groove 11. As shown in FIGS. 2, 4, and 6, two protrusion assemblies 50 are provided. When the high side of the transmission member 30 extends in the up-and-down direction, the two protrusion assemblies 50 can be spaced apart in the up-and-down direction. A gap between the two adjacent protrusion assemblies 50 can extend along a horizontal direction. This helps the transmission member 30 to drive the lens module 40 to move along the X-axis and Y-axis directions.

Optionally, as shown in FIGS. 4 to 6, the protrusion part 51 is in a shape of a long strip extending along the axial direction of the transmission member 30, for example, a trapezium or rectangle. The plurality of protrusion parts 51 of two adjacent protrusion assemblies 50 are in one-to-one correspondence in position in the axial direction of the transmission member 30, such that the direction of the action force applied by the transmission member 30 to the lens module 40 is controlled precisely using the drive member 20, thus preventing the two protrusion assemblies 50 from interfering with each other.

In some specific implementations of this application, the drive member 20 is a piezoelectric element.

The piezoelectric element according to embodiments of this application is described in detail below with reference to the accompanying drawings.

As shown in FIG. 2, being above the bracket 10 is defined as being on the first side of the bracket 10. In other words, the piezoelectric element may be disposed above the bracket 10, and the transmission member 30 may be disposed above the piezoelectric element. In a case that the transmission member 30 is an annular member, the mounting channel 31 can be formed in the transmission member 30, at least part of the lens module 40 can be disposed in the mounting channel 31, and the outer peripheral surface of the lens module 40 is connected to the inner peripheral surface of the transmission member 30. Therefore, when energized, the piezoelectric element can generate a drive force through vibration and the transmission member 30 can be connected to the piezoelectric element and transmit the drive force, allowing the lens module 40 to move under the drive force. The bracket 10 may be a metal member able to improve the vibration amplitude.

It should be noted that the piezoelectric element includes a piezoelectric vibration material having a piezoelectric effect, and the piezoelectric vibration material can convert mechanical and electrical energies to each other. Piezoelectric vibration materials mainly include piezoelectric ceramics, piezoelectric fibers, and the like. It should be noted that the piezoelectric effect means that some crystals generate charges proportionally under the action of a mechanical stress or deform geometrically and proportionally under the action of an external electric field. Piezoelectric effects can be classified into direct piezoelectric effect and inverse piezoelectric effect. The inverse piezoelectric effect means that when an electric field is applied to a piezoelectric crystal in the absence of an external force, centers of positive and negative charges therein are displaced and in turn the material is mechanically deformed, where the magnitude of the deformation is proportional to the intensity of the electric field.

In other words, when an operating voltage is input to the piezoelectric element of the camera module 100 according to embodiments of this application, the piezoelectric element can deform, thereby generating vibration. This in turn drives at least part of the transmission member 30 connected to the piezoelectric element to vibrate in the ultrasonic frequency range. It should be noted that, with the operating position of the piezoelectric element and the operating voltage input to the piezoelectric element controlled, different parts of the piezoelectric element can deform to different degrees, for example, generating an annular traveling wave.

In addition, as shown in FIG. 4, during assembly, the lower end of the lens module 40 is mounted in the mounting channel 31, and the relative positional relationship between the upper end of the lens module 40 and the upper end of the mounting channel 31 is not limited. After energized, the piezoelectric element can deform and vibrate. Because the transmission member 30 is connected to both the piezoelectric element and the lens module 40, the transmission member 30 can transmit the drive force generated by the piezoelectric element to the lens module 40, causing the lens module 40 to move. In addition, because the outer peripheral surface of the lens module 40 is connected to the inner peripheral surface of the transmission member 30, the transmission member 30 can support the lens module 40 and also limit its position, and a friction force is generated between the transmission member 30 and the lens module 40 during vibration of the transmission member 30, where the friction force can serve as a drive force to push the lens module 40 to move in the mounting channel 31.

It should be noted that the camera module 100 according to embodiments of this application is applicable to electronic devices including but not limited to cell phones. The camera module 100 according to embodiments of this application can also have an anti-shake effect during picture or video shooting. Optionally, the camera module 100 according to embodiments of this application further includes a gyroscope and a processor. The gyroscope can first measure the shake direction and shake angle of the lens module 40. The processor can then receive the data sent by the gyroscope, calculate the operating voltage to be input to the piezoelectric element based on the shake angle, and select the operating position of the piezoelectric element according to the shake direction. After that, the processor inputs the operating voltage to the piezoelectric element, so that different parts of the piezoelectric element experience different degrees of deformation, thus causing different parts of the transmission member 30 to deform and vibrate. The friction thus caused drives the lens module 40 to move in a preset angle, thus compensating the vibrating optical path of the lens module 40 for displacement or rotation, reducing the blur of shots.

According to this embodiment, the transmission member 30 indirectly connects the piezoelectric element having the inverse piezoelectric effect to the lens module 40, with the operating voltage input to the piezoelectric element controlled, so that the transmission member 30 vibrates, and the transmission member 30 in vibration can drive, through friction, the lens module 40 to move. As compared with the prior art, the camera module 100 according to embodiments of this application has an anti-shake effect and can drive the lens module 40 to provide displacement/rotation compensation. In addition, because the flexible circuit board 70 connected to the piezoelectric element in the camera module 100 according to embodiments of this application is not pulled to a large extent, no S-shaped cable box that can receive the flexible circuit board 70 needs to be additionally disposed on a side of the lens module 40, thus saving the space, allowing for a high utilization of the internal space of an electronic device equipped with the camera module 100 according to this embodiment of this application. In another aspect, because the piezoelectric element cooperates with the transmission member 30, the transmission member 30 can vibrate in the ultrasonic frequency range, thus expanding the movement range, for example, the rotation angle range, of the lens module 40.

Figure 3:
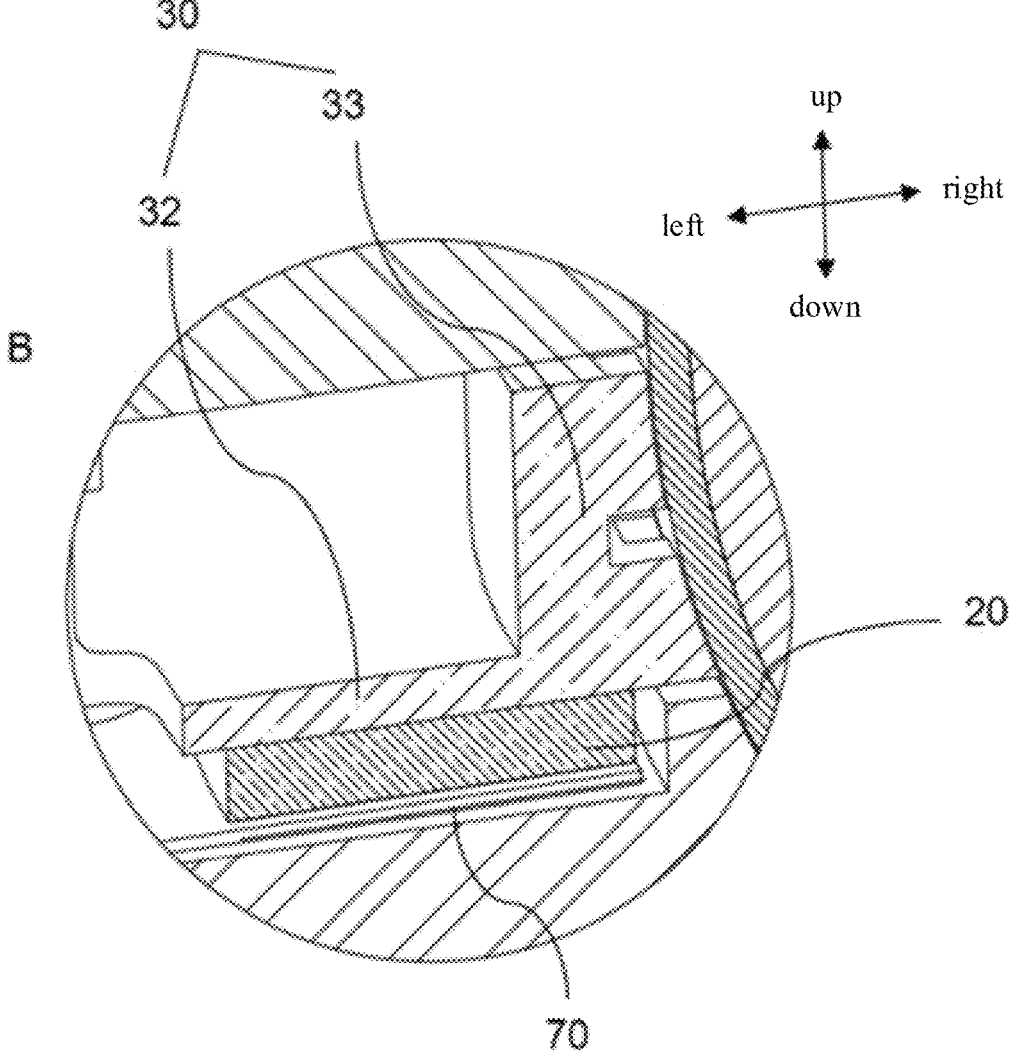
FIG. 3 is an enlarged view of part B circled in FIG. 2.

Further, the piezoelectric element is sheet-shaped, with a first side abutting against the bracket 10 and a second side abutting against the transmission member 30. As shown in FIGS. 2 and 3, when the lower side of the piezoelectric element is defined as the first side and the upper side is defined as the second side, the piezoelectric element is sheet-shaped, with the bracket 10 provided below and the transmission member 30 provided above. The upper end surface of the piezoelectric element can abut against the transmission member 30 and the lower end surface of the piezoelectric element can abut against the bracket 10. The connection between the piezoelectric element and the transmission member 30 may include tight compressing, bonding, welding, or the like.

Optionally, a plurality of piezoelectric elements are provided, for example, 4 as shown in FIG. 5. The plurality of piezoelectric elements are connected head to tail to form an annular shape corresponding to the shapes of the bracket 10 and the transmission member 30. The corresponding direction of the friction force between the transmission member 30 and the lens module 40 is controlled through the cooperation between at least two piezoelectric elements, thus improving the transmission efficiency of the drive force. It should be noted that the quantity of the piezoelectric elements includes but is not limited to 4, for example, being 6. The piezoelectric element may be provided in an odd or even quantity, which is not limited herein.

The movement of the camera module 100 is described below with the quantity of piezoelectric elements being four with reference to the accompanying drawing.

Figure 9:
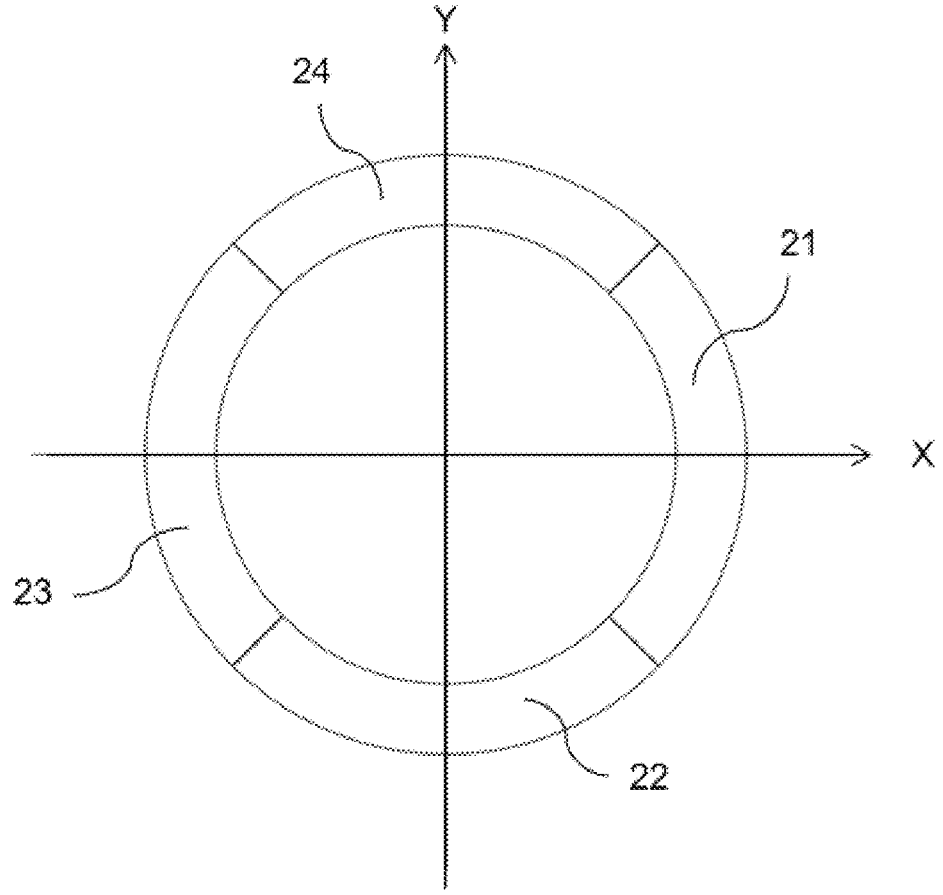
FIG. 9 is a schematic diagram of fitting of four piezoelectric elements of a camera module according to an embodiment of this application.

As shown in FIG. 9, the four piezoelectric elements include a first piezoelectric element 21, a second piezoelectric element 22, a third piezoelectric element 23, and a fourth piezoelectric element 24. The four piezoelectric elements are all disposed on plane XY, the transmission member 30 is located above the piezoelectric elements, and the lens module 40 and the transmission member 30 are distributed along the Z-axis direction. The first piezoelectric element 21 and the second piezoelectric element 22 are arranged along the Y-axis direction and symmetrical about the axis X, the second piezoelectric element 22 and the third piezoelectric element 23 are arranged along the X-axis direction and symmetrical about the axis Y, the third piezoelectric element 23 and the fourth piezoelectric element 24 are arranged along the Y-axis direction and symmetrical about the axis X, and the fourth piezoelectric element 24 and the first piezoelectric element 21 are arranged along the X-axis direction and symmetrical about the axis Y.

When two phases of sinusoidal excitation electrical signals with a phase difference of 90° are respectively applied to the first piezoelectric element 21 and the third piezoelectric element 23, the second piezoelectric element 22 and the fourth piezoelectric element 24 do not operate, and the transmission member 30 vibrates and drives, through friction, the lens module 40 to swing along the X-axis direction with the axis Z a symmetry axis. Exchanging the excitation signals applied to the first piezoelectric element 21 and the third piezoelectric element 23 can change the movement direction of the lens module 40.

In the same way, when two phases of sinusoidal excitation electrical signals with a phase difference of 90° are respectively applied to the second piezoelectric element 22 and the fourth piezoelectric element 24, the first piezoelectric element 21 and the third piezoelectric element 23 do not operate, and the lens module 40 can swing along the Y-axis direction with the axis Z a symmetry axis. Exchanging the excitation signals applied to the second piezoelectric element 22 and the fourth piezoelectric element 24 can change the movement direction of the lens module 40.

When signals such as two phases of sinusoidal excitation electrical signals with a phase difference of 90° are respectively applied to the first piezoelectric element 21 and second piezoelectric element 22, the second piezoelectric element 22 and third piezoelectric element 23, the third piezoelectric element 23 and fourth piezoelectric element 24, or the fourth piezoelectric element 24 and first piezoelectric element 21, the lens module 40 rotates about the Z-axis direction with the axis Z a symmetry axis.

Based on this, during picture or video shooting, the processor can calculate the operating voltage to be input to the piezoelectric element based on the shake angle of the camera module measured by the gyroscope and select, according to the data of shake direction, a piezoelectric element whose position is opposite to the shake direction as an operating piezoelectric element. That is, the four piezoelectric elements cooperate depending on the shake angle. Then, the processor inputs the operating voltage to the operating piezoelectric element, causing the operating piezoelectric element to deform and in turn causing the different parts of the transmission member 30 to deform and vibrate. The friction drives the lens module 40 to rotate at any angle (about the X-axis direction, Y-axis direction, or Z-axis direction), thus implementing the displacement/rotation compensation for the lens module 40.

It can be seen that the cooperation between the plurality of piezoelectric elements can drive the lens module 40 to rotate at large angles about the X-axis, Y-axis, and Z-axis directions, thus implementing the anti-shake function.

It should be noted that other types of excitation electrical signals may be input instead to control the movement direction and movement angle of the lens module 40, which is not limited herein.

Figure 8:
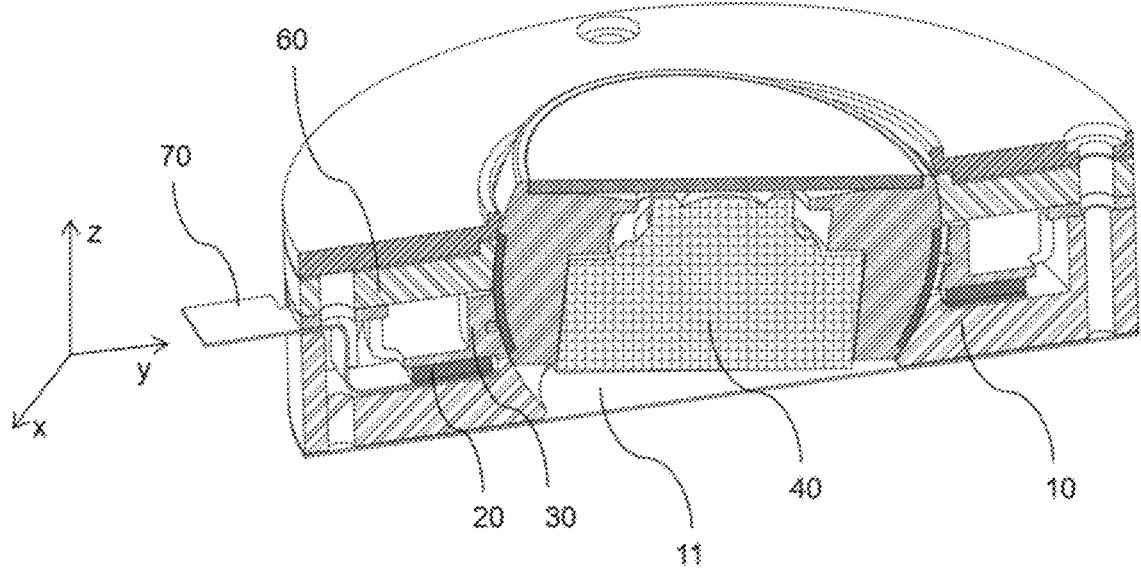
FIG. 8 is a schematic diagram of a lens module of a camera module rotating about an X-axis or Y-axis direction according to an embodiment of this application.

According to an embodiment of this application, as shown in FIG. 2 and FIG. 8, a side wall of the groove 11 and an inner peripheral surface of the transmission member 30 are both curved surfaces extending along an axial direction of the lens module 40. The lens module 40 includes a lens bracket 41 and a lens 42. The lens bracket 41 may be a columnar member, an outer peripheral surface of part of the lens bracket 41 is a curved friction surface, and the curved friction surface can be attached to the inner peripheral surfaces of the bracket 10 and the transmission member 30. It should be noted that the curved friction surface can be connected to the curved surface of the transmission member 30 alone or to both the curved surface of the bracket 10 and the curved surface of the transmission member 30, which is not limited herein. The lens 42 is provided in the lens bracket 41, the lens bracket 41 can support the lens 42 and limit its position, and the lens 42 and the lens bracket 41 can move synchronously.

It should be noted that, as compared with the rectangular lens bracket in the prior art, the outer peripheral surface of the lens bracket 41 arranged as a curved friction surface can not only reduce the size of the lens bracket 41, but also help the lens bracket 41 to drive the lens 42 to move at multiple angles, for example, to move along the axis X, axis Y, and axis Z. This can effectively prevent the lens bracket 41 in motion from interfering with other components such as the bracket 10 and the transmission member 30. Moreover, as the inner peripheral surfaces of the bracket 10 and the transmission member 30 are arranged as curved surfaces and a side of the protrusion part 51 facing towards the lens bracket 41 is also arranged as a curved surface, the attachment fitting between the protrusion part 51 and the lens bracket 41 can be improved, thus improving the stability of the lens module 40 in motion. In addition, the overall size of the camera module 100 can be also reduced, thus allowing for a high utilization of the internal space of an electronic device equipped with the camera module 100.

In addition, as shown in FIGS. 1 and 2, above the transmission member 30, a fixing bracket 60 is also provided which is disposed on the first side of the bracket 10. The fixing bracket 60 is provided with a through hole, meaning the fixing bracket 60 can be formed as a hollow annular member. The lens module 40 faces towards the through hole so as to find a view via the through hole. Optionally, the transmission member 30 may be screwed to the fixing bracket 60. The inner wall surface of the fixing bracket 60 is formed as a curved surface, and the curved surfaces of the fixing bracket 60, the transmission member 30, and the bracket 10 can smoothly transition. The shape of the entire curved surface formed by the three is roughly the same as the shape of the curved friction surface of the lens bracket 41, facilitating the rotation of the lens bracket 41.

Figure 7:
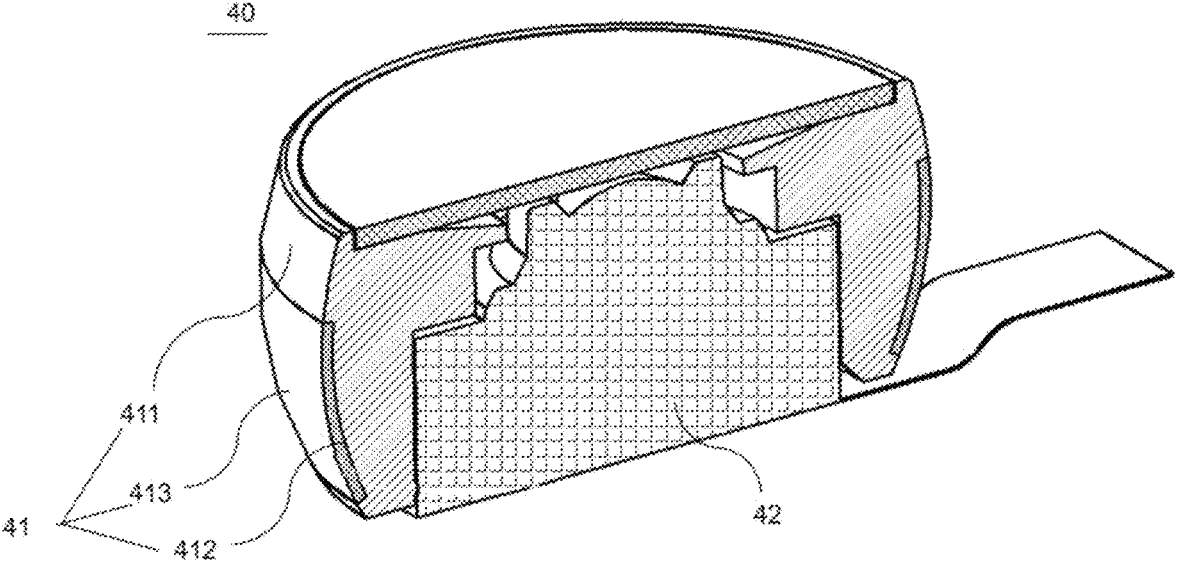
FIG. 7 is a schematic structural diagram of a lens module of a camera module according to an embodiment of this application.

Optionally, as shown in FIG. 7, the lens bracket 41 includes a lens bracket body 411 and a friction piece 413. The lens bracket body 411 is a columnar member, the outer peripheral surface of the lens bracket 41 is provided with an annular groove 412 extending along its own peripheral direction, and the friction piece 413 is provided in the annular groove 412. The friction piece 413 is mounted in manners including but not limited to snapping, bonding, and the like. Further, the outer peripheral surface of the friction piece is a curved friction surface. It should be noted that, as shown in FIG. 2, when two protrusion assemblies 50 are provided and spaced apart in the up-and-down direction, at least part of the friction piece 413 in the up-and-down direction is located between the protrusion assemblies 50. This can not only increase the friction performance, but also improve the movement stability of the camera module 100.

In some specific implementations of this application, as shown in FIG. 7, the friction piece 413 corresponds to the annular groove 412 in shape, which facilitates not only the mounting of the friction piece 413 but also the curve transition between the edge of the friction piece 413 and the lens bracket body 411. As shown in FIG. 7, in the axial direction of the transmission member 30, the outer peripheral surface of the friction piece 413 is longer than the inner peripheral surface of the transmission member 30. In other words, when the lens module 40 moves, at least one of two ends of the friction piece 413 in the up-and-down direction can extend beyond the end of the transmission member 30. This can not only increase the rotation angle of the lens module 40, but also prevent the lens module 40 from separating from the transmission member 30, thus avoiding that the lens module 40 cannot be reset.

In summary, the camera module 100 according to the embodiments of this application transmits, through the cooperation between the drive member 20 and the transmission member 30, the drive force to the lens module 40, thus driving the lens module 40 to move. When the piezoelectric element having an inverse piezoelectric effect is used as the drive member 20, the piezoelectric element can make the transmission member 30 vibrate in the ultrasonic frequency range and make, through friction, the vibrating transmission member 30 drive the lens module 40 to move. The camera module 100 according to the embodiments of this application not only has the advantages of high power, high efficiency, and good movement stability of the lens module 40, but also can implement the anti-shake effect when the lens module 40 rotates at a large angle about the X-axis, Y-axis, and Z-axis directions, thus improving the quality of shots. In addition, when applied to electronic devices, the camera module 100 according to the embodiments of this application also has the advantage of occupying a small space, thus improving the internal space of the electronic device.

The electronic device according to the embodiments of this application can be any electronic devices suitable for including the camera module 100, such as cell phones, laptops, tablet computers, or wearable devices.

In the description of this specification, descriptions referring to the terms "an embodiment", "some embodiments", "exemplary embodiments", "an example", "a specific example", or "some examples" mean the specific features, structures, materials or characteristics described with to the embodiment or example are included in at least one embodiment or example of this application. In this specification, illustrative expressions of these terms do not necessarily refer to the same embodiment or example. Moreover, the specific features, structures, materials, or characteristics described may be combined in any suitable manners in any one or more embodiments or examples.

Although some embodiments of this application have been illustrated and described, those of ordinary skill in the art can understand that various changes, modifications, substitutions, and variations of these embodiments may be made without departing from the principle and purpose of this application, and the scope of this application is defined by the claims and their equivalents.

What is claimed is:

1. A camera module, comprising:
a bracket, wherein the bracket is provided with a groove;
a drive member, wherein the drive member is disposed on a first side of the bracket;
a transmission member, wherein the transmission member is disposed on an inner wall of the groove, and the transmission member is electrically connected to the drive member; and
a lens module, wherein at least part of the lens module is disposed in the groove, the lens module is movably connected to the transmission member, and the transmission member is configured to drive the lens module to move;
wherein the transmission member comprises a first segment and a second segment that are connected sequentially, wherein
the first segment is disposed on the first side of the bracket; the first segment extends in a direction away from the groove and perpendicular to an axial direction of the groove; in the axial direction of the groove, the drive member is disposed between the bracket and the first segment; and in the axial direction of the groove, one side of the drive member away from the bracket, is in contact with the first segment;
the second segment is disposed on the inner wall of the groove, and an end of the second segment back away from the first segment is movably connected to the lens module.

2. The camera module according to claim 1, wherein the first segment and the second segment are integrally formed, and the second segment is an annular structure.

3. The camera module according to claim 1, wherein an inner peripheral surface of the transmission member is provided with a protrusion assembly along a peripheral direction of the transmission member, the protrusion assembly comprising a plurality of protrusion parts, wherein the plurality of protrusion parts are spaced apart along the peripheral direction of the transmission member, each of the protrusion parts protrudes inward with respect to an inner surface of the transmission member, and an inner surface of each of the protrusion parts abuts against the lens module.

4. The camera module according to claim 3, wherein the protrusion assembly is provided in a quantity of at least two, and the at least two protrusion assemblies are spaced apart along the axial direction of the groove.

5. The camera module according to claim 3, wherein the protrusion part is in a shape of a long strip extending along the axial direction of the transmission member, and the plurality of protrusion parts of adjacent two of the protrusion assemblies are in one-to-one correspondence in position in the axial direction of the transmission member.

6. The camera module according to claim 1, wherein the drive member is a piezoelectric element.

7. The camera module according to claim 6, wherein the piezoelectric element is provided in plurality, and the plurality of piezoelectric elements are connected head to tail to form an annular shape corresponding to a shape of the transmission member.

8. The camera module according to claim 1, wherein a side wall of the groove and an inner peripheral surface of the transmission member are both curved surfaces extending along an axial direction of the lens module, and the lens module comprises:
a lens bracket, wherein an outer peripheral surface of part of the lens bracket is a curved friction surface, the curved friction surface being attached to the inner peripheral surface of the transmission member; and
a lens, wherein the lens is disposed in the lens bracket.

9. The camera module according to claim 1, further comprising:
a fixing bracket, wherein the fixing bracket is disposed on the first side of the bracket, the fixing bracket is provided with a through hole, and the lens module faces toward the through hole.

10. The camera module according to claim 1, wherein in the axial direction of the groove, the one side of the drive member away from the bracket, is in direct contact with the first segment.

11. The camera module according to claim 10, wherein in the axial direction of the groove, the one side of the drive member away from the bracket, is in direct contact with both of the first segment and the second segment.

12. The camera module according to claim 1, wherein the bracket, the drive member and the first segment are stacked sequentially along the in the axial direction of the groove.

13. The camera module according to claim 6, wherein the piezoelectric element is sheet-shaped; in the axial direction of the groove, an upper end surface of the piezoelectric element away from the bracket, abuts against the transmission member, and an opposite lower end surface of the piezoelectric element abuts against the bracket.

* * * * *